United States Patent [19]

Levitan

[11] Patent Number: 5,081,340
[45] Date of Patent: Jan. 14, 1992

[54] HEATING ELEMENTS FOR PLASTIC FILM LAMINATORS

[75] Inventor: David M. Levitan, Wheeling, Ill.

[73] Assignee: Technologies Development Incorporated, Wheeling, Ill.

[21] Appl. No.: 475,448

[22] Filed: Feb. 6, 1990

[51] Int. Cl.$^5$ .............................................. H05B 3/26
[52] U.S. Cl. ................................. 219/469; 219/543
[58] Field of Search ............... 219/543, 467, 470, 471, 219/216; 392/432, 438

[56] References Cited

U.S. PATENT DOCUMENTS

| | | | |
|---|---|---|---|
| 2,357,845 | 9/1944 | Nordquist | 219/469 |
| 3,399,292 | 8/1968 | Boldridge | 219/469 |
| 3,546,433 | 12/1970 | Johnson | 219/469 |
| 3,649,810 | 3/1972 | Tsuboi | 219/216 |
| 4,034,189 | 7/1977 | Sakamaki | 219/216 |
| 4,071,737 | 1/1978 | Marshall | 219/543 |
| 4,395,109 | 7/1983 | Nakajima | 219/216 |
| 4,791,275 | 12/1988 | Lee | 219/469 |
| 4,820,904 | 4/1989 | Urban | 219/469 |

FOREIGN PATENT DOCUMENTS 2099670 12/1982 United Kingdom ................ 219/390

Primary Examiner—Teresa J. Walberg
Attorney, Agent, or Firm—Kinzer, Plyer, Dorn, McEachran & Jambor

[57] ABSTRACT

A heating element for a plastic film laminator has a base member, either flat or cylindrical. An insulating layer of non-conductive material is formed on the base member. A heating layer formed of conductive resin such as conductive silicone is molded to the base member, with the insulating layer between the base and heating layer. An outer layer of non-conductive silicone may cover the heating layer. Electrical contacts are connected to opposite sides of the heating layer. An electrical power supply is connectable to the contacts. Current passing through the heating layer provides uniform heating which is transferred to the plastic to be laminated.

16 Claims, 2 Drawing Sheets

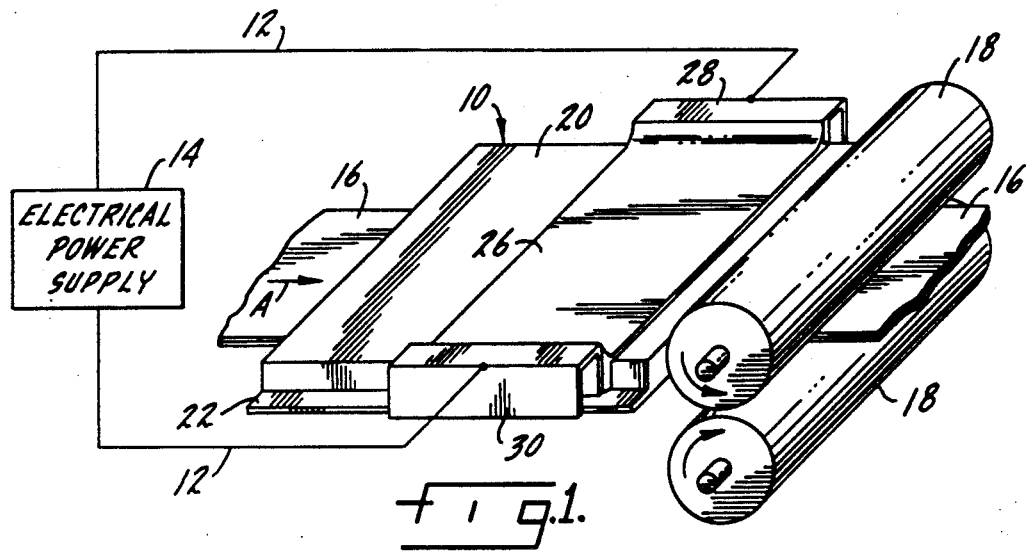
Fig. 1.
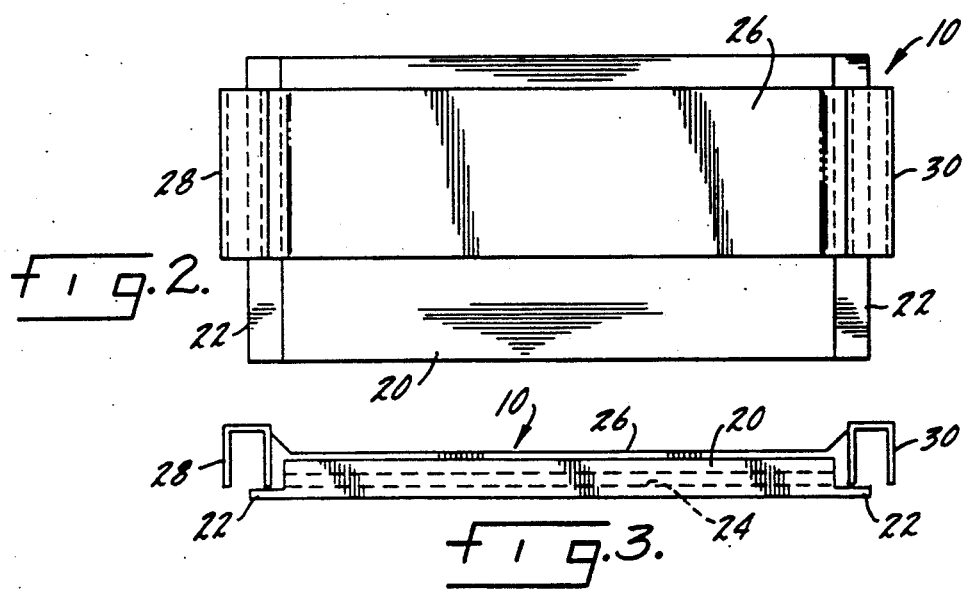
Fig. 2.
Fig. 3.
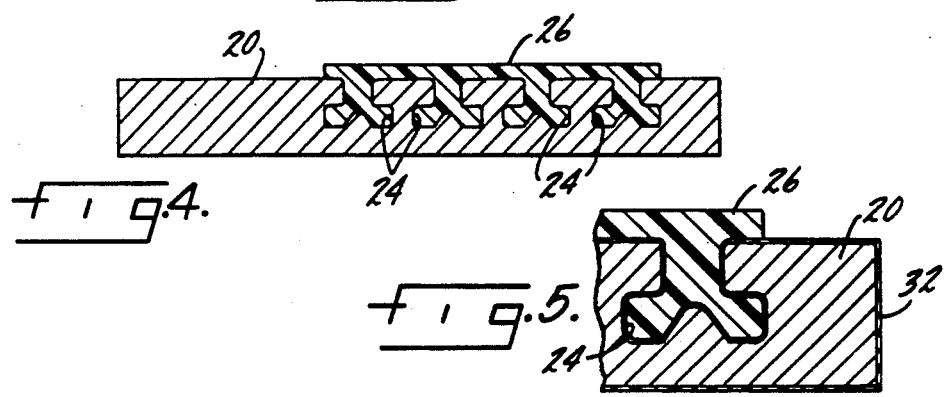
Fig. 4.
Fig. 5.

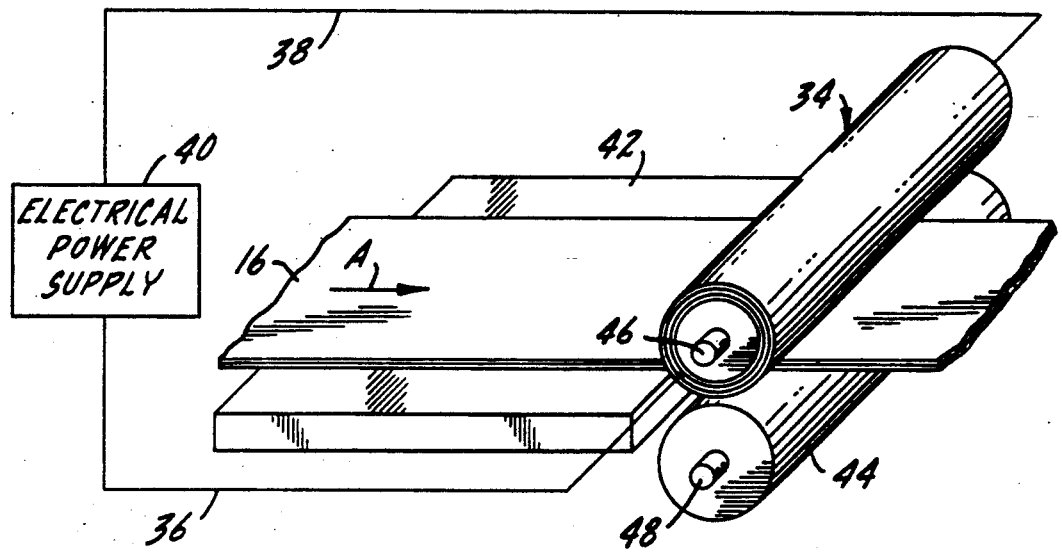
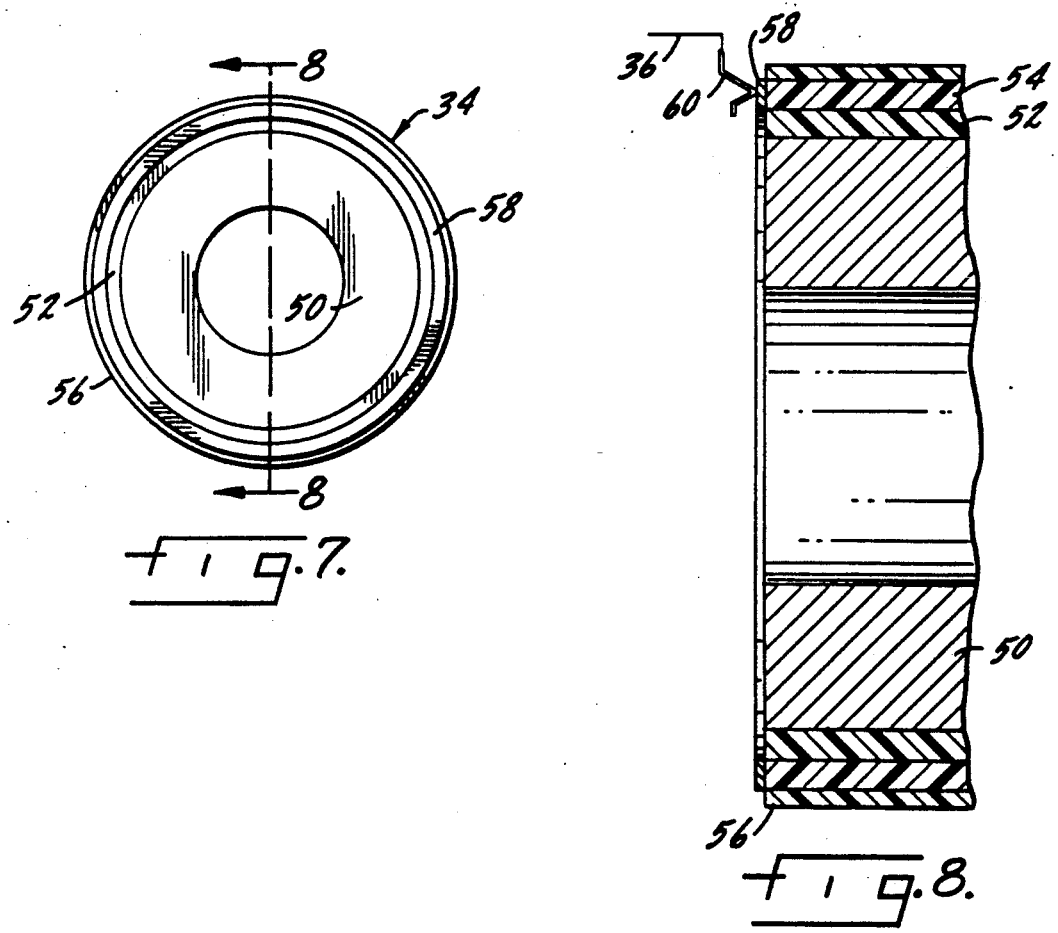

HEATING ELEMENTS FOR PLASTIC FILM LAMINATORS

BACKGROUND OF THE INVENTION

This invention relates to plastic film laminators of the type used for applying protective coverings to drivers licenses, identification cards, menus, photographs and other products formed of laminated plastic film. Such products typically comprise a paper card or the like placed between layers of plastic film such as polyethylene-coated Mylar. The plastic layers extend somewhat beyond the edges of the card. When the edges of the plastic layers are sealed by heating a protective pocket is formed around the card.

Generally, there are two main types of laminating machines. In smaller machines, heating of the plastic film to aid in lamination is accomplished by means of flat platens. An early example of a flat platen laminator is Elliott U.S. Pat. No. 2,927,620. A more recent example is Levitan U.S. Pat. No. 3,770,550. The other basic type of laminating machine uses heated rollers in the lamination process. These are usually larger machines. An example is Eisner U.S. Pat. No. 3,027,285.

In either a flat platen laminator or a heated roller laminator, probably the most expensive individual component is the heater. Conventionally, in a flat platen laminator, the heated platen is formed of metal with an electrically conductive heating element mounted on the side of the platen opposite that past which the plastic film moves. The surface of the platen may be treated or coated to reduce friction with respect to the plastic film that must pass over the platen. In some machines pressure is applied to the plastic as it traverses the platen. Perhaps more frequently, the pressure is effected with pressure rolls located immediately beyond the heating platen.

A similar situation applies with respect to heated roller laminators. Again, the heating element may be a conductive wire, in this instance wound around a shaft or other like support and covered over with an outer shell that constitutes the contact element with the plastic film. The outer shell on the heated laminator roll may be metal or it may be resin. Again, there may be a coating to minimize friction with the plastic film. The heated laminator roll may be a part of a pressure-applying mechanism or the pressure may be applied immediately after the plastic film traverses the heater roll.

SUMMARY OF THE INVENTION

The present invention is directed to an improved heating element for plastic laminating machines. A primary object of the invention is a heating element that can be produced at materially reduced cost compared to existing devices.

Another object of the invention is a heating element of the type described the design of which minimizes the chances of manufacturing errors.

Another object of the invention is a heating element having improved heat transfer characteristics, particularly in the uniformity of heat applied throughout the surface of the heating element.

A further object of the invention is a heating element of the type described which can be adapted for either flat platen heaters or heated rollers.

Other objects may become evident in the following specification, drawings and claims.

The heating element includes a relatively rigid base member, which may be either flat or cylindrical. An insulating layer of electrically non-conductive material is applied to the base member. A heating layer of electrically conductive resin is formed on the insulating layer. The heating layer may be, for example, conductive silicone which is molded onto the base member. First and second contacts which may be in the form of clips or a slip ring are electrically connected to the conductive resin of the heating layer. The contacts are electrically connectable to a power supply to form an electrical circuit with current passing through the heating layer of conductive resin. It may be desirable to further include an outer layer or coating over the heating layer, particularly in the cylindrical form. An outer layer may also be used in the flat platen version if it is desired to run the plastic to be laminated directly over the heating layer.

BRIEF DESCRIPTION OF THE DRAWINGS

FIG. 1 is a perspective view of a portion of a flat platen laminating machine, with the heating element of the present invention.

FIG. 2 is a plan view of the flat platen heating element.

FIG. 3 is an end elevation view of the flat platen heating element.

FIG. 4 is longitudinal section through the flat platen heating element.

FIG. 5 is an enlarged detail view of the flat platen base member showing the hard coat anodizing layer.

FIG. 6 is a perspective view of a portion of a heated roller laminating machine, showing an alternate embodiment of the heating element of the present invention.

FIG. 7 is an end view of the heated roller element.

FIG. 8 is a section taken along line 8—8 of FIG. 7.

DETAILED DESCRIPTION OF THE INVENTION

FIG. 1 illustrates the flat platen embodiment of the heating element of the present invention. The heating element is shown generally at 10. In a laminating machine the heating is connected by lines 12 to an electrical power supply 14. Plastic film 16 to be laminated passes either over or under the heating element 10. FIG. 1 shows the film passing under the element in the direction indicated by arrow A. After being heated by the heating element 10 the film 16 is typically compressed between rotating rollers 18. Another, identical heating element is positioned beneath the first so that a machine will have an upper and lower heating element to comprise the heater system which applies heat to both sides of the material to be laminated.

FIGS. 2-5 illustrate details of the flat platen heating element 10. The element has a base member 20 which includes flanges 22. The base member must have good thermal conductivity. Aluminum has been found to be a suitable material. A plurality of generally T-shaped grooves 24 are formed in one surface of the base. The base member shown is about 2 3/16 inches by 4¼ inches and about 0.275 inches thick. The base member may vary in length to about twenty inches.

A heating layer 26 is formed on the surface of the base member having the grooves 24. The layer is formed of a conductive resin. It is molded onto the base member and interlocked with the grooves 24. The heating layer 26 is preferably a conductive silicone such as that sold by Dow Corning of Midland, Mich. under their designation Compound X58318 or Compound X58305. Other resins may also be used. For illustrative purposes only, the total resin thickness to the bottom of the grooves could be about 0.250 inches, with about 0.050 inches of that protruding above the surface of the base member. The area covered by the heating layer may be about 1¼ inches by 4 inches.

First and second contacts 28 and 30 are attached to the flanges 22 of the base member. The contacts are insulated from the base member by suitable insulation. The contacts are connectable to electric lines 12 which place the heating layer 26 in circuit with the power supply 14. As best seen in FIG. 3 the heating layer is molded in contact with the clips to make electrical connection therewith. The clips 28 and 30 have an inverted U-shape making them suitable for serving as supports for the heating element 10 within the housing of a laminating machine.

With a metal base layer, an insulating layer 32 must be provided to avoid having the base short out the heating layer 26. One form of insulating layer 32 is shown in FIG. 5 as a hard coat anodizing layer of 0.5 to 2 mils thickness. It is shown as extending about the entire surface of the base member and this will be the most convenient arrangement from a manufacturing standpoint. It will be understood that the insulating layer could be located only underneath the heating layer 26. Further, other materials or techniques could be used to provide the necessary electrical insulation.

FIG. 1 shows the plastic 16 passing the heating element 10 on the side opposite the heating layer 26. This is perhaps the arrangement more commonly used with wire heaters and can be used with this invention. In this case heat is generated by current passing through the conductive resin of the heating layer. The heat passes through the base layer into the plastic to be laminated. Because of the uniform width and location of the heating layer 26, the present invention further admits the possibility of running the plastic over the heating layer itself. This would mean running it over the top as seen in FIG. 1. This has the advantage of more direct heat transfer and possible energy savings since the base member would not have to be heated. If the plastic 16 were run over the conductive resin side of the heating element, it may be desirable to add an outer coating or cover on the outer surface of the resin as a low friction support for the moving plastic film.

FIGS. 6-8 show an embodiment of the present invention in the heated roller type of laminator. The heated roller is electrically connected by lines 36 and 38 to a power supply 40. Plastic film 16 to be laminated moves over an unheated support 42 in the direction of arrow A. The support 42 may optionally be heated or it could be deleted from the structure entirely. The plastic is compressed between rotating heated roller 34 and a lower roller 44. The lower roller may or may not be heated also. The rollers are supported on shafts 46 and 48.

The heated roller 34 includes a cylindrical core 50 that could be formed of steel or other suitable material. The core has a hollow center for receiving shaft 46. The core 50, if it is made of a conductive material, is coated with an insulating layer 52. The insulating layer could be a non-conductive silicone resin or any other insulation coating.

The next layer in the heated roller 34 is the heating layer 54. It is formed of a conductive resin, typically an electrically conductive silicone as set forth above. Finally, there is an outer layer 56. It is preferably an insulator but one with reasonably good thermal conductivity. A silicone resin could be used, but others may prove satisfactory. For illustrative purposes only, on a 2-inch diameter core, the thickness of the insulating and heating layers 52 and 54 could be about 0.100 inch each. The outer layer thickness could be about half that.

The electrical contacts for the heated roller include slip rings 58 attached at each end of the heating layer 54. One of the slip rings is seen in FIG. 8. Brushes 60 are provided in sliding contact with the slip rings 58. The lines 36 and 38 are connected to the brushes 60.

It can be seen that the two forms of heating element described above eliminate the resistance wire or similar devices of prior art laminating machines. In operation, the heating layers of the heating element convert electric current from the power supply to heat which is transferred to the plastic film being laminated. The use of conductive resin for the heating layer allows that layer to be molded in exactly the configuration desired, thus greatly reducing the chance of manufacturing errors as well as reducing the cost of making the heating element.

While a preferred form of the invention has been shown and described, it will be realized that alterations may be made thereto without departing from the scope of the following claims.

I claim:

1. A heating element for a plastic film laminator, comprising:
   a relatively rigid base member;
   an insulating layer of electrically non-conductive material formed on the base member;
   a heating layer of electrically conductive resin formed on the insulating layer;
   a plurality of grooves formed in the base member into which the insulating layer and heating layer extend to fix said layers to the base member; and
   first and second contact means electrically connected to the conductive resin of the heating layer and electrically connectable to a power supply such that an electrical circuit is formed with current passing through the heating layer of conductive resin.

2. The heating element of claim 1 wherein the base member is a flat plate with the insulating and heating layers formed on at least one surface thereof.

3. The heating element of claim 2 wherein the contact means comprise a pair of clips fixedly attached to the heating layer, the clips providing attachment elements for mechanical support of the heating element.

4. The heating element of claim 2 wherein base member is made of aluminum and the insulating layer is hard coat anodizing.

5. The heating element of claim 1 wherein the grooves are T-shaped.

6. The heating element of claim 1 wherein the base member is a cylindrical core.

7. The heating element of claim 6 wherein the insulating and heating layers extend around the circumference of the core.

8. The heating element of claim 6 wherein the insulating layer is made of non-conductive silicone.

9. The heating element of claim 6 further comprising a coating layer formed on top of the heating layer.

10. The heating element of claim 6 wherein the contact means comprises a pair of slip rings, one slip ring being attached at one end of the heating layer and the other being attached to the other end of the heating layer.

11. The heating element of claim 1 further comprising a coating layer formed on top of the heating layer.

12. The heating element of claim 11 wherein coating layer is made of non-conductive silicone.

13. The heating element of claim 1 wherein heating layer is made of conductive silicone.

14. The heating element of claim 1 wherein the heating layer is flared adjacent the point of connection with the contact means to decrease the current density at said connection.

15. The heating element of claim 1 wherein the base member is a flat plate with the insulating and heating layers formed on at least one surface thereof and the plate is beveled at one end.

16. A plastic laminating machine, comprising:
a heating element having a relatively rigid base member, an insulating layer of electrically non-conductive material formed on the base member, a heating layer of electrically conductive resin formed on the insulating layer, and first and second contact means electrically connected to the conductive resin of the heating layer and electrically connectable to a power supply such that an electrical circuit is formed with current passing through the heating layer of conductive resin;
means for feeding a plastic film to be laminated past the heating element; and
a guide member for supporting the plastic film as it is moved by said means for feeding.

* * * * *